(12) United States Patent
Bolz

(10) Patent No.: US 8,725,392 B2
(45) Date of Patent: May 13, 2014

(54) DEVICE FOR CONTROLLING AN INJECTION VALVE ACTUATOR FOR AN INTERNAL COMBUSTION ENGINE

(75) Inventor: Stephan Bolz, Pfatter (DE)

(73) Assignee: Continental Automotive GmbH, Hannover (DE)

( * ) Notice: Subject to any disclaimer, the term of this patent is extended or adjusted under 35 U.S.C. 154(b) by 87 days.

(21) Appl. No.: 13/503,496

(22) PCT Filed: Oct. 19, 2010

(86) PCT No.: PCT/EP2010/065676
§ 371 (c)(1),
(2), (4) Date: May 25, 2012

(87) PCT Pub. No.: WO2011/048071
PCT Pub. Date: Apr. 28, 2011

(65) Prior Publication Data
US 2012/0227710 A1    Sep. 13, 2012

(30) Foreign Application Priority Data
Oct. 21, 2009    (DE) .......................... 10 2009 050 127

(51) Int. Cl.
*F02D 41/20*    (2006.01)

(52) U.S. Cl.
USPC ........... 701/113; 701/104; 123/478; 123/490; 361/140; 361/154

(58) Field of Classification Search
USPC ........... 701/104, 113; 123/478, 490; 361/140, 361/152–154
See application file for complete search history.

(56) References Cited

U.S. PATENT DOCUMENTS

| 4,292,948 | A | * | 10/1981 | Graessley | ...... 123/490 |
| 6,333,843 | B2 | * | 12/2001 | Boie et al. | ...... 361/140 |
| 7,546,830 | B2 | * | 6/2009 | Nagase et al. | ...... 123/490 |
| 8,061,333 | B2 | | 11/2011 | Bolz | |
| 2010/0043757 | A1 | | 2/2010 | Bolz | |
| 2010/0242920 | A1 | * | 9/2010 | Omori et al. | ...... 123/490 |

FOREIGN PATENT DOCUMENTS

| DE | 3344662 A1 | 6/1985 |
| DE | 4024496 A1 | 2/1992 |
| DE | 10242606 A1 | 3/2004 |
| DE | 102007006179 A1 | 8/2008 |

OTHER PUBLICATIONS

International Search Report, Dated Jan. 21, 2011.

* cited by examiner

*Primary Examiner* — Erick Solis
(74) *Attorney, Agent, or Firm* — Laurence A. Greenberg; Werner H. Stemer; Ralph E. Locher

(57) ABSTRACT

A device for controlling an injection valve actuator for an internal combustion engine has a voltage source, the voltage of which is high compared to the voltage of a vehicle battery and which is connected to the actuator by way of at least one controllable switch. A switching controller can be connected to the vehicle battery at the input end and it is connected to the voltage source at the output end to generate the high voltage from the voltage of the vehicle battery. The switching controller is designed in such a way that the high voltage of the voltage source is regulated to a higher value as the temperature increases.

4 Claims, 3 Drawing Sheets

DEVICE FOR CONTROLLING AN INJECTION VALVE ACTUATOR FOR AN INTERNAL COMBUSTION ENGINE

BACKGROUND Of THE INVENTION

Field of the Invention

In contemporary conventional spark ignition engines, the fuel is usually injected into the intake manifold directly upstream of the respective inlet valve of a cylinder by means of solenoid injectors. This method permits extremely precise quantity control of the fuel and forms a significant part of the preparation of the mixture of fuel and air.

In order to improve the efficiency and performance of the engine, in the last few years a method for injecting fuel directly into the combustion chamber has been developed. However, significantly higher fuel pressures are necessary, for example 100 to 200 bar as opposed to 3 to 4 bar in the case of intake manifold injection. At the same time, the ratio of the smallest injected fuel quantity to the largest injected fuel quantity per injection process has to be reduced. Since the largest injected fuel quantity is now determined by the maximum performance of the engine, this means that the smallest possible injection quantity has to be reduced. However, the injection valves are configured as switching valves (open/closed) and it is virtually impossible to reduce the minimum quantity by partial opening (partial stroke) in a stable and reproducible fashion.

An approach to a solution to reducing the minimum quantity is to reduce the switching times of the injector valve, wherein either a solenoid injector valve or a piezo injector valve can be used. In the case of a solenoid injector valve, the valve opens counter to the force of a closing spring by means of an electromagnet (solenoid) which has an inductor for functional reasons. When a voltage is applied to the winding of the solenoid, the current builds up which generates a magnetic field which develops a force for opening the valve. If this force is larger than the closing force of the closing spring, the valve opens. In order to close the valve, the previously applied voltage is removed, the coil current decreases and as a result the magnetic force also decreases. As soon as this force is smaller than the force of the closing spring, the valve is closed.

It is an impediment here that the magnetic force is built up only in a delayed fashion after the application of the voltage owing to the self-induction of the solenoid coil, and the magnetic force is in turn reduced only after a delay after the removal of the voltage.

The valve therefore reacts with a delay to the control voltage, wherein a minimum time period is required for the purpose of completely opening with immediate closing, which in turn determines the smallest possible injection quantity.

The switching times can be reduced for a given winding inductance of the solenoid mainly by increasing the applied voltage, since this accelerates the rise in the current. Accordingly, direct injection valves are not operated with the currently still customary 12 V on-board power system voltage of a motor vehicle but instead a relatively high voltage is used at least for the duration of the buildup of current and the reduction of current. This relatively high voltage is acquired here from the 12 V on-board power system voltage by means of a switching controller which operates as a boost converter. After the working current is reached, the control voltage can then be reduced again to a relatively low value which is determined essentially by the resistance of the winding and the working current which is necessary to keep the valve open. The 12 V on-board power system voltage is then generally sufficient.

A fuel injection system and an operating method which is suitable therefor is described, for example, in EP 1 396 630 A2. In said document, two solenoid coils 13 are shown as an example, wherein basically one is provided per cylinder. The solenoid coils are connected via a first switch 33 to a voltage source 32 which comprises a boost convertor which generates a sufficiently high voltage for actuating the solenoid coils 13 from the battery voltage 26a. The solenoid coils are also connected via a second switch 34 to the battery voltage 26a and to ground via third switches 36 or 37, respectively, and a current measuring circuit 49. A control circuit 39 controls the switches.

In order to open the valve, the switches 33 and 36 (or 37) are first switched on. As a result, the solenoid coil 13 is connected to ground and to the increased voltage 32, which brings about a rapid buildup of current. If the desired operating current in the solenoid coil is reached, the switch 33 switches off and the switch 34 is switched on, wherein the current now flows from the vehicle battery 26a through the switch 34 and the diode 35. In order to close the valve, the switches 34 and 36 are switched off and the energy stored in the coil 13 discharges via the diode 38. In principle, a connection via a further diode to the voltage source 32 could also be provided, with the result that the energy stored in the solenoid coil 13 could be partially recovered.

For the quickest possible buildup of current and reduction of current it is desirable to have the highest possible voltage at the output of the boost convertor. However, this runs counter to economic considerations (costs due to relatively poor efficiency and relatively expensive components) and technical difficulties (maximum dielectric strength of the components, increased EMC interference signal generation, increased power loss) in the implementation of the controller. Correspondingly, the output voltage thereof is set to a value of approximately 60 to 80 V, which represents a compromise between function (valve switching time) and costs. In order to ensure reliable operation at all operating temperatures, two contradictory properties have to be taken into account.

The winding resistance of the solenoid coil increases as the temperature rises. The coefficient of the temperature is here $p=0.43\%/°C$. For the entire working range of the injector from $-40°C$ to $+160°C$ this means a change in resistance of $\Delta R = \Delta T * p = 200°C.*0.43\%/°C.=88.6\%$. A typical solenoid coil has, at room temperature, for example 1.5 Ohms, and at $-40°C$. 1.23 Ohms, and then $+160°C$. at 2.47 Ohms. Given an output voltage of the switching controller of 75 V, this change in resistance leads to a variation in the time up to the point when the working current of approximately 12 A is reached. Correspondingly, the switch-on time of the injector also changes by more than 10%, which is problematical particularly in the case of very small quantities.

Furthermore, the maximum permissible cut-off voltage of the MOSFETs which are generally used in the switching controller increases as the temperature rises, but decreases as the temperature falls. The coefficient of temperature is typically $V_{Ds}/V_{Ds+25} \sim 0.1\%/°C$. (cf. data sheet IRL2908, International Rectifier). In a customary MOSFET the maximum permissible cut-off voltage is specified at $+25°C$. However, at the minimum operating temperature of $-40°C$. this decreases by $V_{Ds-40}/V_{Ds} \sim -65°C. \times 0.1\%/°C. \sim -6.5\%$. A MOSFET specified with an 80 V cut-off voltage can therefore only be operated up to approximately 75 V at $-40°C$.

If the output voltage of the switching regulator remains constant in the entire working temperature range, when the MOSFET is selected it is necessary to select a type with a correspondingly relatively high dielectric strength. However, this entails additional costs since the switch-on resistance RDSON rises as the cut-off voltage rises and a correspondingly higher MOSFET has to be used.

BRIEF SUMMARY OF THE INVENTION

The objective of the invention is then to solve these two problems.

They are solved by a device for controlling the injection valve actuator of an internal combustion engine having the features as claimed. Advantageous developments are given in the dependent claims.

According to the invention, in a device for controlling an injection valve actuator of an internal combustion engine, having a voltage source with a voltage which is high compared to the voltage of a vehicle battery and which is connected to the actuator via at least one controllable switch, having a switching controller which can be connected on the input side to the vehicle battery and is connected on the output side to the first voltage source in order to generate the high voltage from the voltage of the vehicle battery, the switching controller is embodied in such a way that the high voltage of the voltage source is regulated to a relatively high value as the temperature increases.

The value of the voltage of the voltage source is therefore changed by the switching controller as a function of the operating temperature in such a way that, on the one hand, the current rise time of the solenoid remains approximately constant and, on the other hand, the maximum permissible cut-off voltage of the MOSFETs is not exceeded.

In a way which is advantageous because it is simple, the switching controller has, for the purpose of measuring its output voltage, a voltage divider which is formed with a temperature-dependent resistor such that as the temperature increases the voltage which is mapped by the voltage divider and which is compared with a reference voltage in order to regulate the output voltage of the switching controller, becomes lower.

As an alternative to this, the switching controller has, for the purpose of measuring its output voltage, a voltage divider and a controllable voltage source which is connected in parallel with one of the resistors of the voltage divider via a further resistor and can be actuated by a temperature-dependent signal.

The device according to the invention can be particularly advantageously used in an actuator which is embodied as a solenoid since the line resistances thereof change markedly over the customary operating temperature range and the invention permits the negative effects to be avoided.

The invention will be explained in more detail below by means of exemplary embodiments and with reference to figures, in which

DESCRIPTION OF THE INVENTION

Figure 1:
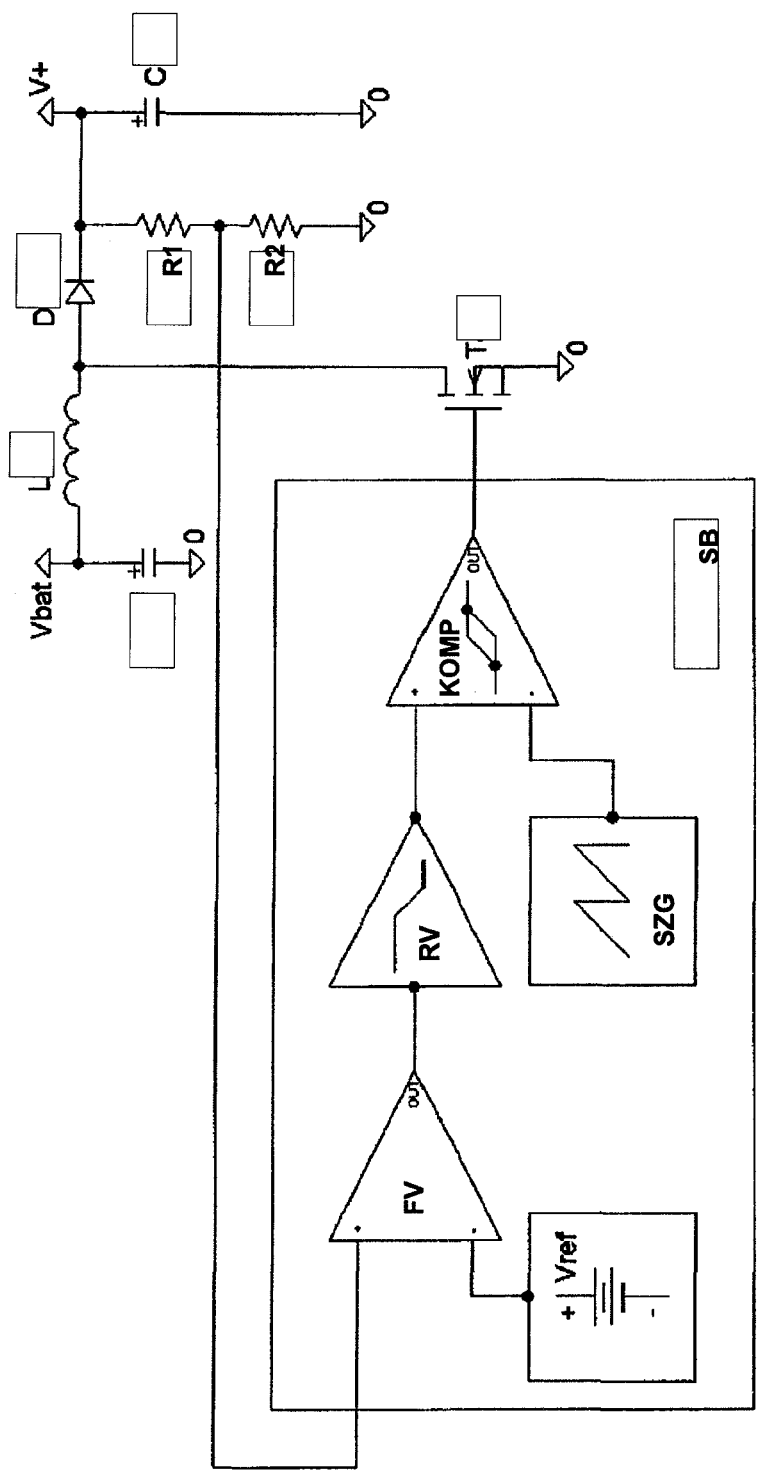
FIG. 1 shows a switching controller according to the prior art which is embodied as a boost converter.

FIG. 1 shows a switching controller which is embodied as a boost converter, such as is known from the prior art (for example "Halbleiter-Schaltungstechnik [Semiconductor technology]" by Tietze/Schenk, Springer Verlag, seventh edition, 1985, section 18.6). The core of a switching controller is a, usually integrated, control module SB (for example SG 2524 of TI). It contains a voltage reference Vref, a fault amplifier FV, a control amplifier RV, a sawtooth generator SZG, a comparator KOMP and usually further functional groups (not illustrated here).

The output of the comparator KOMP, which also forms the output of the control module SB, actuates a transistor circuit T which is connected in series with a coil L which is supplied by a battery voltage Vbat. The center tap between the coil L and the transistor switch T is connected via a diode D with its polarity in the conduction direction to a voltage source V+ which is formed with a suitable capacitor C. The voltage of the voltage source V+ is adjusted to a predefined value by clocked switching on and off of the transistor switch T using the control module SB. For this purpose, the voltage of the voltage source V+ is mapped into a voltage which is to be processed by the control module SB, by means of a voltage divider composed of resistors R1 and R2 which are connected in parallel with the capacitor C of the voltage source V+, wherein the control module SB supplies at its output a pulse-width-modulated control signal for the transistor switch T which is dependent on the deviation of the detected voltage of the voltage source V+ with respect to the reference voltage Vref.

For this purpose, the fault amplifier FV detects the deviation between Vref and the output voltage V+ which has been adapted by means of the voltage divider R1, R2. The downstream control amplifier generates therefrom a direct voltage which is compared in the comparator KOMP with the voltage of the sawtooth generator SZG. This results in a signal with a constant frequency with a variable pulse-duty factor which controls the transistor switch T. If the latter is switched on, the coil L is charged; if the transistor switch T is switched off, the coil L discharges via the diode D into the capacitor C of the voltage source V+. As a result, the energy extracted from a load is subsequently supplied at the voltage source V+. The controller objective is that the voltage at the voltage divider R1, R2 has the same value as Vref, as a result of which the voltage V+ is stabilized at the value $V+=Vref*(R1+R2)/R2$.

The temperature-dependent change in V+ can then take place in an inventive fashion by virtue of the fact that the voltage divider R1/R2 is supplemented with a temperature-variable resistor R5 or in that a temperature-dependent current is introduced into the center tap of the voltage divider R1/R2 via a further resistor R6. In both cases, the control module SB will attempt to keep the voltage at the voltage divider R1/R2 at the value of Vref, as a result of which the voltage V+ then changes.

Figure 2:
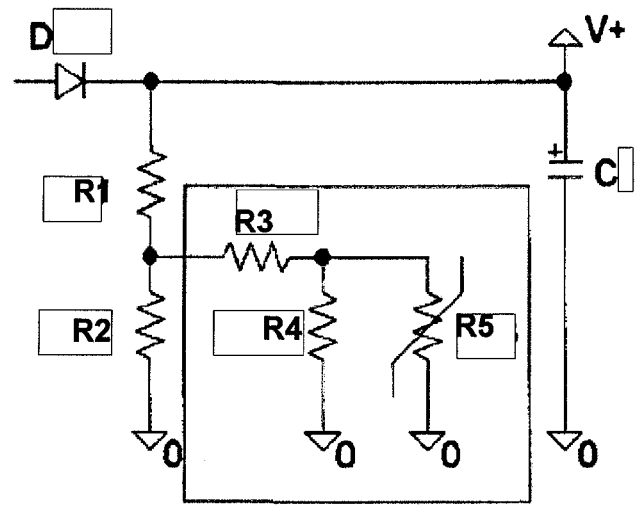
FIG. 2 shows a first device according to the invention for temperature-dependent adjustment of the output voltage of the switching controller.

In FIG. 2, the resistor R5 is embodied as a temperature-variable resistor with a negative temperature coefficient (NTC). Further resistors R3 and R4 serve to adapt and linearize the temperature control of the high voltage of the voltage source V+. According to FIG. 2, the series circuit of these resistors R3, R4 is connected in parallel with the resistor R2 of the voltage divider R1/R2, wherein the temperature-dependent resistor R5 is connected in parallel with the resistor R4.

Figure 3:
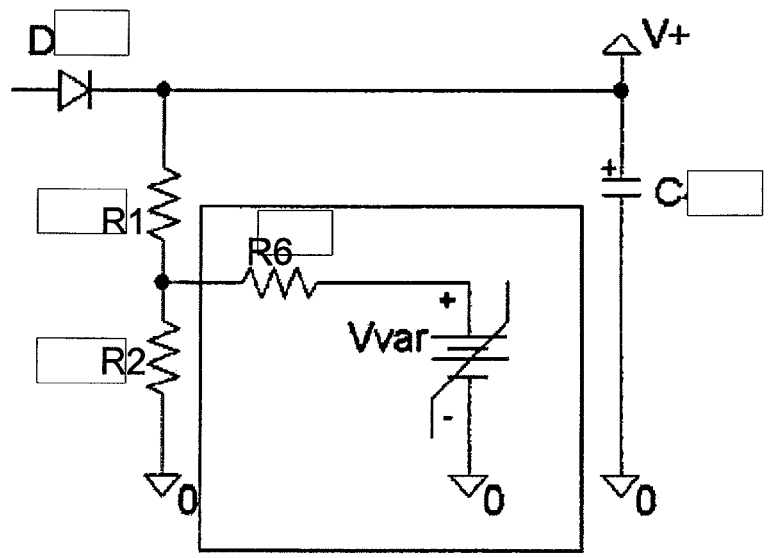
FIG. 3 shows a second device according to the invention for temperature-dependent adjustment of the output voltage of the switching controller.

Alternatively, according to FIG. 3 the voltage of the voltage source V+ can be changed by changing a control voltage Vvar, which supplies a current into the center tap of the voltage divider R1/R2. For example, the output voltage of a microcontroller MC can serve as the temperature-variable voltage Vvar, which microcontroller MC detects the temperature of the motor and of the control electronics via additional sensors and calculates the value of Vvar from these measured values.

Figure 4:
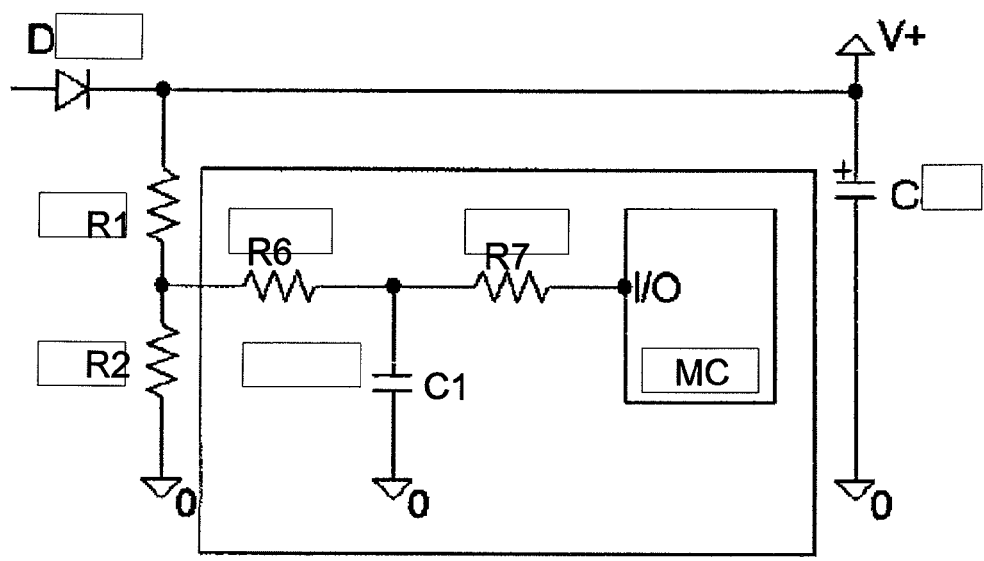
FIG. 4 shows a third device according to the invention for temperature-dependent adjustment of the switching controller output voltage.

If the microcontroller MC does not have an analog output, the control voltage Vvar can also be generated by means of a digital output as a pulse-width-modulated signal, which is then filtered in order to obtain the mean value by means of a low-pass filter (R7, C1). This is shown in FIG. 4.

As a result of this measure, the current rise time and therefore the switch-on time of the injector in the operating temperature range remains virtually constant and the maximum permissible breakdown voltage of the MOSFET is not exceeded.

The invention claimed is:

1. A device for controlling an injection valve actuator of an internal combustion engine in a vehicle having a vehicle battery with a given battery voltage, the device comprising:
    a voltage source having a high voltage that is high relative to the battery voltage and at least one controllable switch connected between said voltage source and the actuator; and
    a switching controller having an input connectible to the vehicle battery and an output connected to said voltage source;
    said switching controller being configured to generate the high voltage from the relatively lower battery voltage and to closed-loop control the high voltage of said voltage source to a relatively higher value as a temperature increases.

2. The device according to claim 1, wherein said switching controller includes a voltage divider for measuring an output voltage thereof, said voltage divider including a temperature-dependent resistor connected such that an output voltage of said voltage divider decreases as the temperature increases.

3. The device according to claim 1, wherein said switching controller comprises, for measuring the output voltage, a voltage divider with resistors and a controllable voltage source connected in parallel with one of said resistors of said voltage divider by way of a further resistor, and wherein said controllable voltage source is controllable by a microprocessor with a temperature-dependent signal.

4. The device according to claim 1, wherein the actuator has a solenoid.

* * * * *